(12) United States Patent
Prater (10) Patent No.: US 6,441,820 B2
(45) Date of Patent: *Aug. 27, 2002

(54) PSEUDO AREA LIGHTS

(75) Inventor: Mitch Prater, Kentfield, CA (US)

(73) Assignee: Pixar Animation Studios, Emeryville, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,674

(22) Filed: Jan. 23, 1998

(51) Int. Cl.[7] .............................................. G06T 15/60
(52) U.S. Cl. ...................................... 345/426
(58) Field of Search ........................................ 345/426

(56) References Cited

U.S. PATENT DOCUMENTS 5,572,635 A * 11/1996 Takizawa et al. ........... 395/126
5,900,850 A * 5/1999 Bailey et al. ................. 345/55

FOREIGN PATENT DOCUMENTS

JP 60-025405 * 2/1985 ........... G01B/11/24

OTHER PUBLICATIONS

Persistence of Vision Ray–Tracer Documentation, (Continuous Tone of Three–Dimensional Objects Illuminated by Sky Light).*

Glassner, Andrew S., "Principles of Digital Image Synthesis," chapter 17, 1995.*

"Continious Tone Representation of Three–Dimensional Objects Illuminated by Sky Light", T. Nishita and E. Nakamae, *Computer Graphics—SIGGRAPH '86 Conference Proceedings*, vol. 20, No. 4, Aug. 1986, pp. 125–132.

Glassner, Andrew S., "The Radiance Equation," *Principles of Digital Image Synthesis*, vol. Two, Morgan Kaufmann Publishers, Inc. San Francisco, CA, (1995), pp. 871–882.

* cited by examiner

*Primary Examiner*—Mark Zimmerman
*Assistant Examiner*—Lance W Sealey
(74) *Attorney, Agent, or Firm*—Arent Fox Kintner Plotkin & Kahn PLLC (57) ABSTRACT

Computer animators have, till now, largely relegated themselves to using point light sources when simulating directional light sources in computer graphics and animation. The illumination achieved is computationally feasible but not totally realistic. While it is possible to use a finite light source of given size and shape to achieve a more realistic effect, the radiosity analysis required to calculate the illumination effect of such a light source is so cumbersome that it cannot be used for real-time computer animation. The described invention allows the animator to approximate the illumination effect of a finite light source by using a point source of varying location and intensity. Another embodiment of the invention allows the animator to realistically simulate ambient light by a similar method. The resulting illumination effects are comparable to those achieved with full radiosity analyses at much lower computational loads.

10 Claims, 7 Drawing Sheets

RENDERING PROCESS

PSEUDO AREA LIGHTS

FIELD OF THE INVENTION

The invention relates generally to the art of computer graphics and animation. More particularly, the invention relates to efficient approximation of finite light sources using point light sources of varying location and intensity.

BACKGROUND OF THE INVENTION

In order to render a scene in computer graphics or computer animation, computer artists and animators often will place one or more light sources within the scene in order to illuminate it. If, for instance, an animator wished to render a room that was lit by two light bulbs, he or she would construct two light sources, representing the light bulbs, and then calculate the illumination effect of these two sources. The standard construct for such directional light sources is the point source, whereby all light is considered to emanate from a single point.

Figure 5:
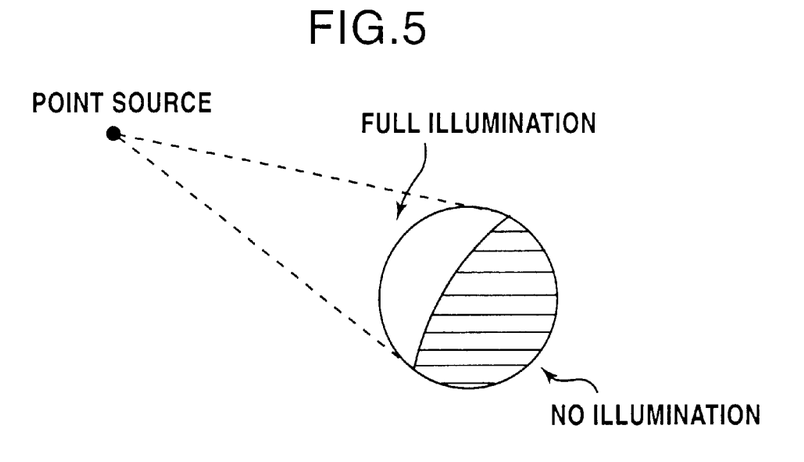
FIG. 5 shows illustrates the problem of unrealistically sharp shadows created by a point light source.

The point source is the standard construct because calculation of its illumination effect is computationally straightforward. For any given surface point within the scene, the rendering method need only calculate the effect of a single ray of light, which has a singular direction and intensity. The disadvantage of using the point source is its lack of realism. When illuminated by a point source, any surface point in the scene will either be illuminated by the point light source, or else wholly hidden from it. As a result, shadows and other partial lighting conditions are rendered in an unrealistically sharp, binary manner (see FIG. 5).

One alternative to using a point light source is to use a finite source, one that has an extended shape and size. The light emerging from a finite source will emanate from its entire surface, and not just a single point. Finite sources illuminate a scene in a much more realistic manner. Some surface points will be illuminated by the entire finite light source, others totally hidden from it. More important is the fact that some points will be partially illuminated by the source.

Despite this superior effect, computer artists and animators do not currently use finite light sources to illuminate their graphics and their scenes. Determination of the total contributing light from a finite light source to a surface point, has, till this point, required a numerical integration over the entire surface of the finite source. Such calculations are simply too cumbersome to be practically used in computer animation. Finite light sources are sometimes used to illuminate single computer-generated scenes or "photos" when a highly realistic image is desired and computational speed is not an issue, but even in these situations the computational burden is considered onerous.

Computer artists and animators run into analogous problems when attempting to simulate ambient light such as skylight. Realistic calculations with respect to simulated ambient light sources are also too cumbersome to make them practical. The conventional technique for simulating ambient light, therefore, is to simply turn up the brightness throughout an entire scene, with perhaps gross modifications for surfaces points that obviously will be differentially affected by the light (such as those under dark shadows). The computation required for this is straightforward, even trivial, but the illumination effect is again not very realistic.

SUMMARY OF THE INVENTION

The invention relates to a method for approximating the illumination effect of a finite light source by a using a point light source of varying intensity and location. These two variables are manipulated depending on the "visibility" of the finite light source from the perspective of the surface point being rendered. The result is realistic illumination with minimal computational effort.

DETAILED DESCRIPTION OF TWO EXEMPLARY EMBODIMENTS

Figure 1:
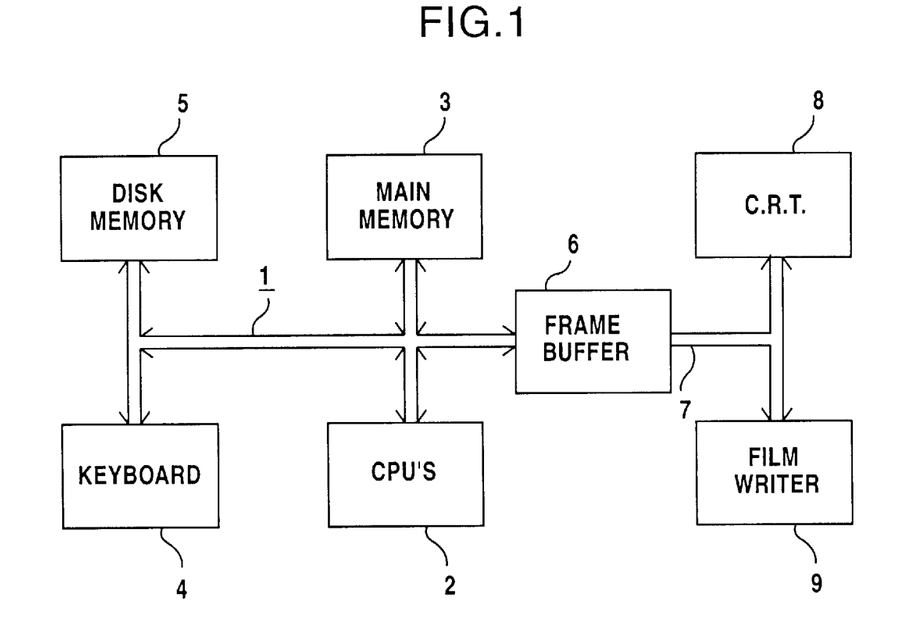
FIG. 1 shows generally the elements of a computer system suitable for carrying out the present invention.
Figure 2:
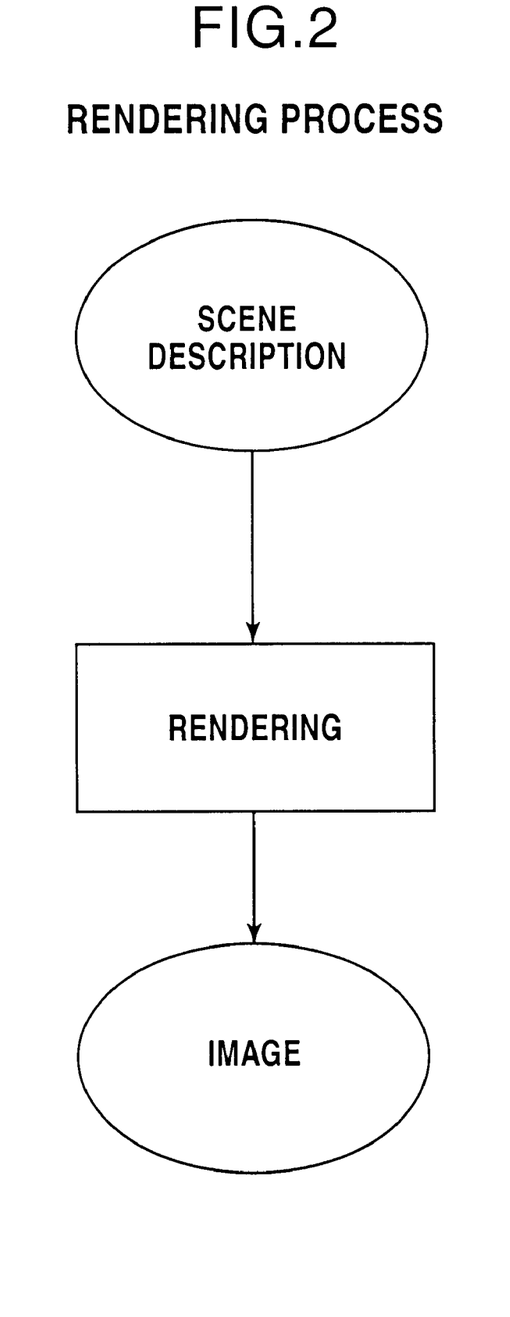
FIG. 2 shows the main steps involved in rendering a computer-animated scene.
Figure 3:
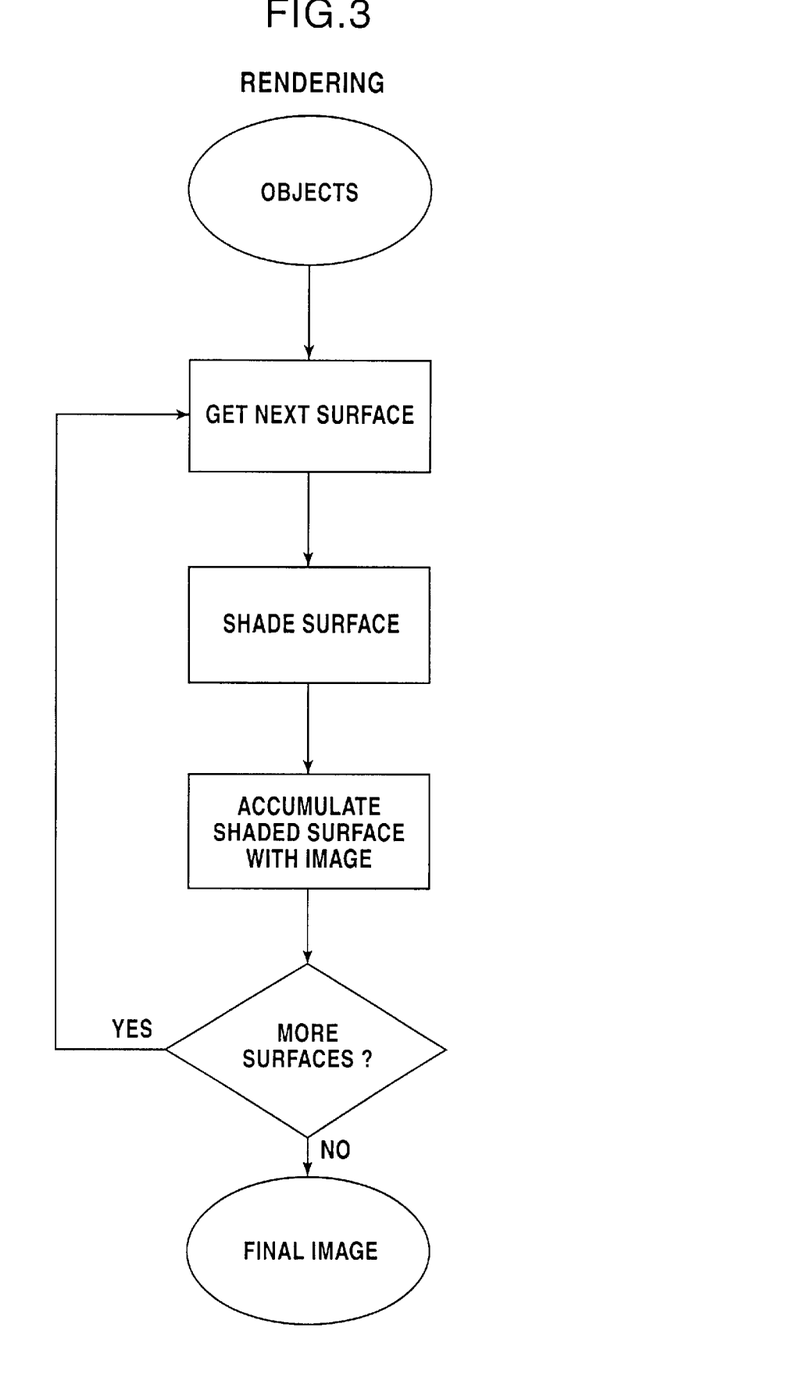
FIG. 3 shows the main steps involved in rendering the surfaces within a computer-animated scene.
Figure 4:
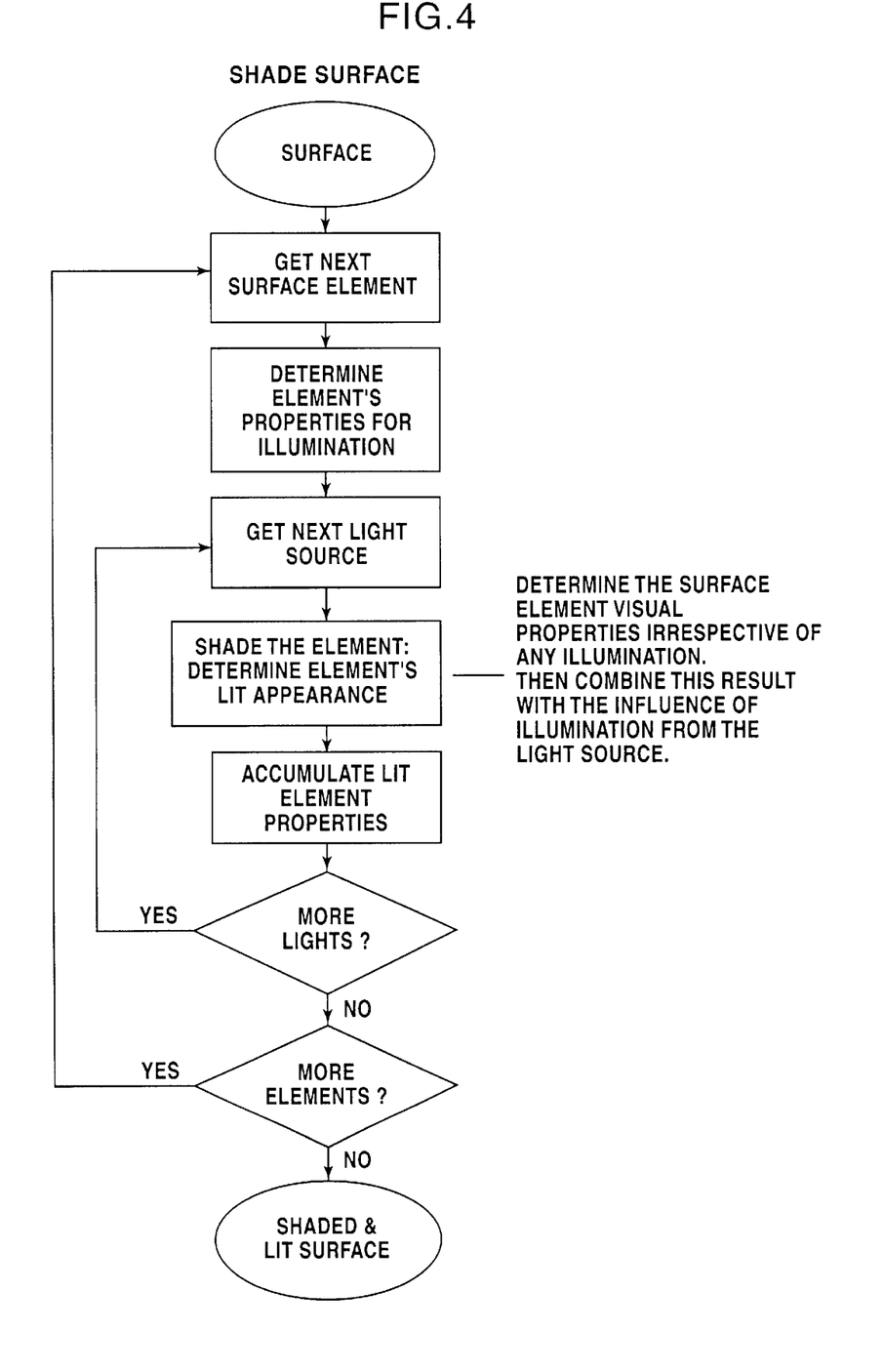
FIG. 4 shows the main steps involved in illuminating and shading a rendered surface within a computer-animated scene.

FIG. 1 shows a computer system suitable for carrying out the invention. A main bus 1 is connected to one or more CPUs 2 and a main memory 3. Also connected to the bus are a keyboard 4 and large disk memory 5. The frame buffer 6 receives output information from the main bus and sends it through another bus 7 to either a CRT or another peripheral which writes the image directly onto film. The computer system is used to approximate the illumination effect of a finite light source and an infinite hemisphere light source. The main steps in carrying out the rendering and illumination of a scene are shown in FIGS. 2–4.

One exemplary embodiment of the invention involves use of a directional light source for general illumination within a scene. Such a light source might be the only light source within a scene, it might be the primary source (supplemented by secondary light sources) or it might be one of a number of primary light sources (such as a number of simulated light bulbs).

Figure 6:
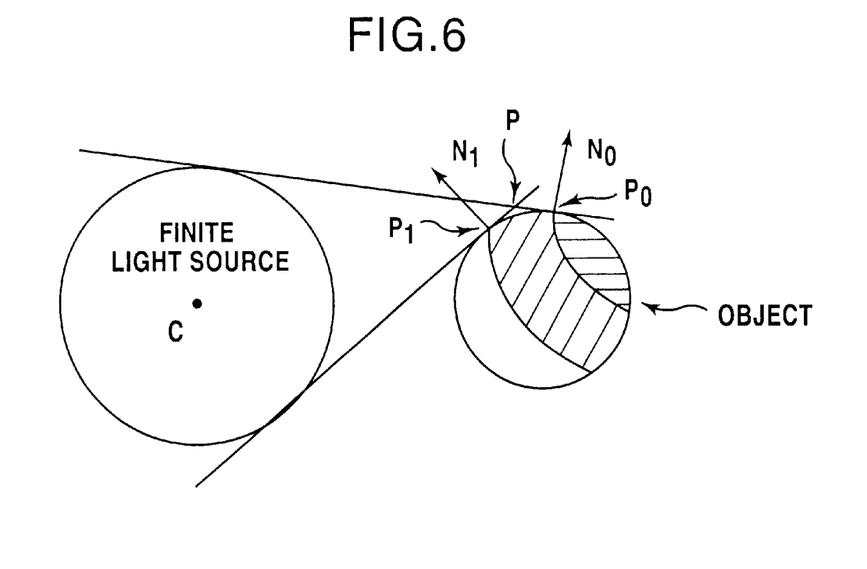
FIG. 6 shows the "terminator region" of partial illumination on an object surface.

FIG. 6 shows a spherical light source illuminating the surface of an object. Spheres are perhaps the most useful shapes to use as light sources because they create an illumination effect similar to that of many real-life directional light sources, such as light bulbs. Computation of their illumination effect, whether by explicit integration or approximation, as in the described invention, is also usually simpler than it is with other shapes. The object to be illuminated is, for illustrative purposes, also shown as a sphere.

With respect to the top of the illuminated object, we can draw two tangents between the light sphere and the object, defining points $P_0$ and $P_1$. Points to the right of $P_0$ are wholly hidden from the light sphere, and thus not illuminated. Points to the left of $P_1$ are wholly illuminated, which means they receive the total illumination of the light sphere. Calculation of both the light intensity and the light vector direction for these points is straightforward (light intensity being some chosen function and vector direction being the vector between the center of the light sphere, C, and the point P being considered).

The points $P_0$ and $P_1$ define a terminator region, within which all points are partially illuminated by the light sphere (note that this terminator region is actually an extended band that circles the sphere, with points analogous to $P_0$ and $P_1$ defining its boundaries). No and $N_1$ are the corresponding normals at those points. Determining the illumination effect by radiosity analysis for each of these points would require a numerically complex integration over the portion of the light sphere that illuminates the points. The described invention approximates these calculations with results that are almost indistinguishable from the numerically complex integration.

Figure 7:
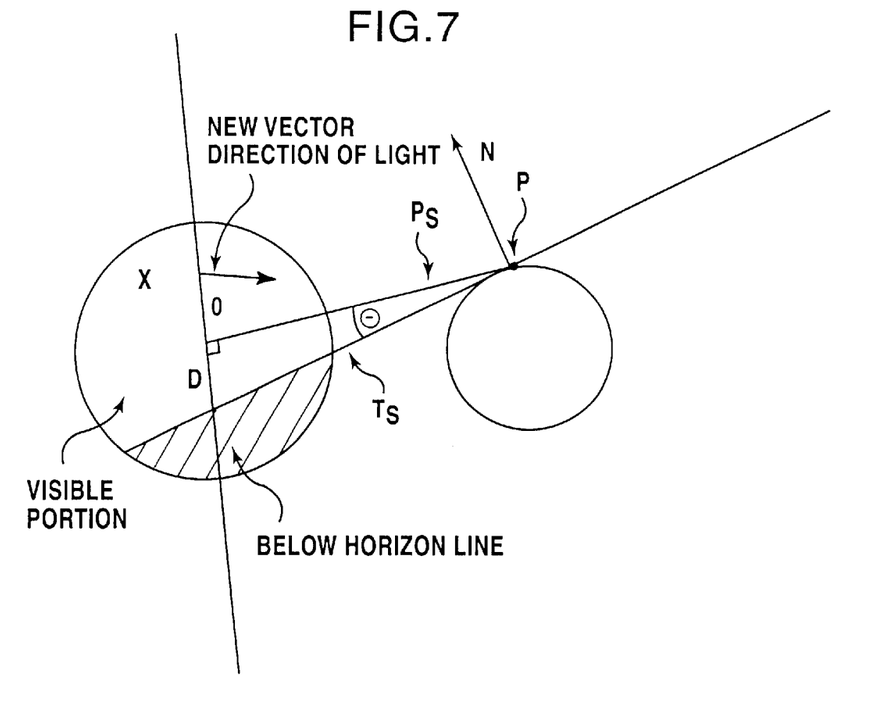
FIG. 7 shows the method for choosing a point light source based upon the surface point in question, which results in a particular light vector direction

FIG. 7 shows a tangent plane, Ts, drawn from one of the points P in the terminator region to the light sphere. The tangent plane can be extended further, so that it cuts through the light sphere. Viewed from the side, plane Ts appears as a tangent line (see FIG. 7).

The portion of the projected disk that is above Ts is above the "horizon line" as seen from point P, and thus considered to shine upon that point. The portion of the light sphere below Ts is below the horizon line, and thus considered hidden from point P.

Comparing Ts with the line drawn from point P to the center of the light sphere, line Ps, it follows that θ, the angle between Ts and Ps, is arccos $(-Ps·N)-\pi/2$ and that D, the distance between the center of the light sphere and the line Ts, is $\tan(\theta) \times Ps$. The vector direction of the light from the truncated sphere to the object can be approximated by creating a "pseudo-center" X with respect to the light sphere. Pseudo-center X is determined by shifting the center of the light sphere, C, a distance D in the direction given by the vector $Ps \times (N \times Ps)$.

The vector from this newly defined X to point P defines the vector direction of light used to illuminate point P (see FIG. 7).

Figure 8:
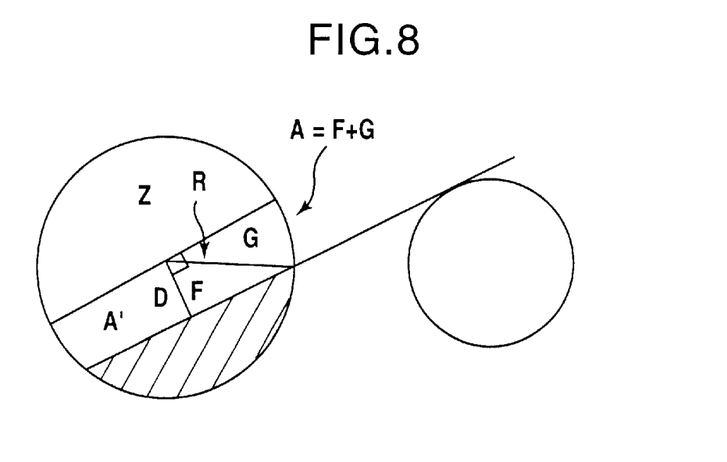
FIG. 8 shows the method for determining the light intensity based upon the portion of the finite light source which is hidden.

The intensity of light reaching the point P will depend on the area of the projection of the truncated light source on a plane perpendicular to the line Ps. That area can in turn be approximated by the area of the truncated sphere projected onto the plane perpendicular to the tangent plane Ts containing the line Ps which is the projection shown in FIGS. 7 and 8.

The intensity of the constructed point source at X that is used to illuminate point P in the terminator region is thus calculated as a function of the portion of the light sphere that is above the horizon, which is also determined from D. We can see in FIG. 8 that the areas of the light sphere visible from point P are areas Z, A and A'. Area Z is simply one-half the area of the disk. Area A is the sum of areas F and G, and the area of A'=A. The area of F is $D(R^2-D^2)^{1/2}/2$ and the area of G is $[R^2 \arcsin(D/R)]/2$. These trigonometric calculations can in practice be approximated by the function $T^2(3-2T)$, where T is defined as $(D+R)/2R$.

Figure 9:
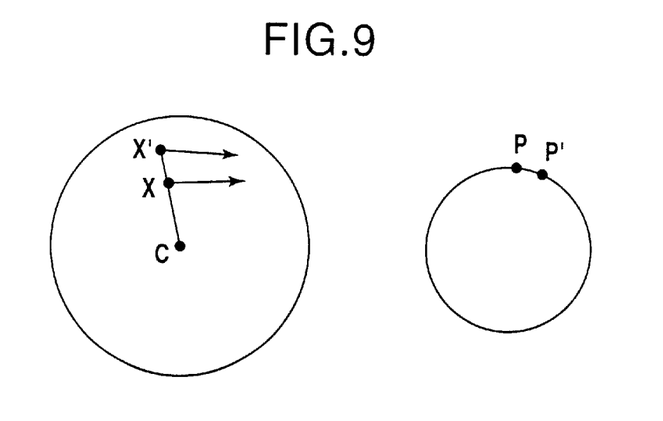
FIG. 9 shows two examples of pseudo-centers used to calculate light vector directions for given points in the terminator region.

The described invention thus uses a point light source of varying location and intensity to approximate the effect of a finite light source. FIG. 9 shows the pseudo-center X, standing alone as a point source, in order to illuminate point P. FIG. 9 also shows another pseudo-center X' derived by the same method and used to illuminate point P'. The invention achieves an illumination effect similar to that of true radiosity analysis at a computational cost comparable to that required for a point source.

Note that in this embodiment of the invention, the vector direction of the light is drawn from the pseudo-center X, and not from some pseudo-surface point at a given radius as one might expect. This simplification helps reduce the computational load. When the radius of the finite light source is small compared to the distance between the source and the surface it illuminates, the simplification does not diminish the realism of the effect.

A second exemplary embodiment of the invention is used to simulate ambient light such as skylight. This embodiment first requires the construction of a lighted hemisphere of infinite radius within a scene. The illumination effect of the hemisphere is then approximated using point sources of varying location to achieve a realistic light effect.

Figure 10:
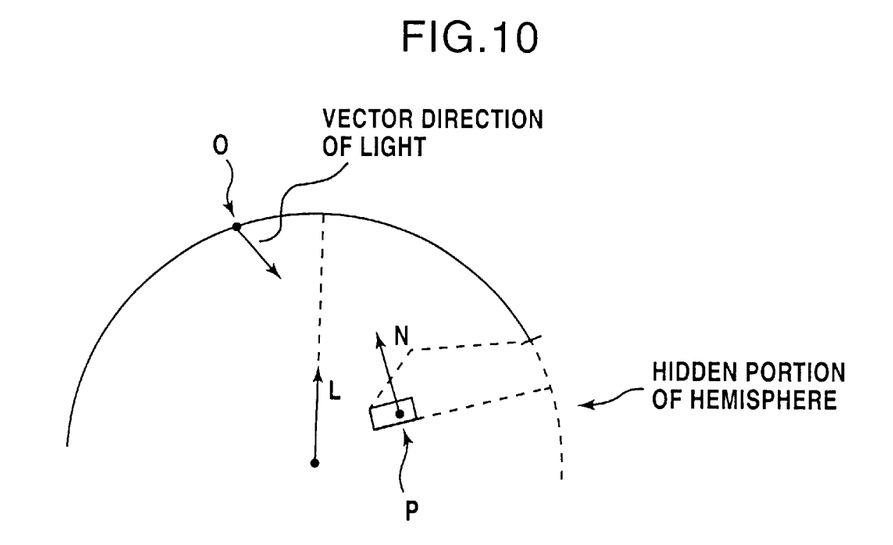
FIG. 10 shows the method of determining the light intensity and light vector direction for a given point under an infinite hemisphere of light, based upon the known tangent plane and normal.

In FIG. 10, we can see the lighted hemisphere that encloses the animated scene like a dome, as well as a point P within that scene. To determine the intensity of ambient light that shines upon that point, we first derive the tangent plane and the normal vector, N, to that point (usually from the function that is used to draw P). If we extend this tangent plane so that it reaches out to infinity and intersects the hemisphere, we can see that only a portion of the hemisphere can actually shine light upon point P. That fraction is $1 \times \arccos(N \cdot L)$, where L is a vector that points toward a chosen "pole" of the hemisphere. The intensity is a simple (usually direct) function of that portion.

The vector direction of light shining upon point P is determined by using the centroid of that portion of the hemisphere cut by the tangent plane. In FIG. 10, we see the centroid O, which is determined by the vector addition of N and L. This centroid then acts a point light source with respect to point P. The vector from O to P defines the vector direction of light. The infinite radius of the light hemisphere serves as a fiction to determine the position of the point O.

The specific arrangements and methods described herein are merely illustrative of the principles of the present invention. Numerous modifications in form and detail may be made by those of ordinary skill in the art without departing from the scope of the present invention. Although this invention has been shown in relation to particular embodiments, it should not be considered so limited. Rather, the present invention is limited only by the scope of the appended claims.

What is claimed is:

1. A method for illuminating surfaces in computer graphics comprising the steps of:
   constructing a plurality of finite light sources within a computer animated scene, each of the finite light sources having a finite size and a center;
   constructing a plurality of surfaces within the scene, each surface consisting of a plurality of points; and
   approximating an illumination effect of each of the finite light sources by the use of a single point light source of varying intensity and location, taking into account the the finite size and center of each of the finite light sources.

2. The method of claim 1 wherein a portion of each of the light sources illuminates each of the points.

3. The method of claim 2 comprising the further step of approximately calculating a light intensity and a light vector direction as a function of the portion of each of the light sources which illuminates each of the points.

4. The method of claim 3 comprising the further step of calculating the light intensity as a function of the portion of the light source which illuminates each of the points.

5. The method of claim 4 comprising the further step of approximating the light vector direction as a function of the portion of the light source shines upon the point.

6. The method of claim 1 wherein said finite light source is a sphere.

7. A method for illuminating surfaces in a computer-modeled scene comprising the steps of:

constructing a plurality of hemispherical light source of finite radius;

constructing a plurality of surfaces with said scene, said surfaces consisting of a plurality of points; and approximating an illumination effect of each of the hemispherical light source by the use of a plurality of point light sources.

8. The method of claim 7, comprising the further step of calculating a light intensity and a light vector direction as a function of a portion of the light source which illuminates each of the points.

9. The method of claim 8 wherein said light vector direction is a function of the portion of said hemispherical light source which shines upon said point.

10. The method of claim 9 wherein said light intensity is a function of the portion of said hemispherical light source which shines upon said point.

* * * * *